(12) United States Patent
Gamoneda et al.

(10) Patent No.: US 10,445,133 B2
(45) Date of Patent: Oct. 15, 2019

(54) DATA PROCESSING SYSTEM HAVING DYNAMIC THREAD CONTROL

(71) Applicant: FREESCALE SEMICONDUCTOR, INC., Austin, TX (US)

(72) Inventors: Jonathan J. Gamoneda, Austin, TX (US); Jehoda Refaeli, Austin, TX (US); Jeffrey W. Scott, Austin, TX (US)

(73) Assignee: NXP USA, Inc., Austin, TX (US)

( * ) Notice: Subject to any disclaimer, the term of this patent is extended or adjusted under 35 U.S.C. 154(b) by 256 days.

(21) Appl. No.: 15/060,692

(22) Filed: Mar. 4, 2016

(65) Prior Publication Data
US 2017/0255485 A1 Sep. 7, 2017

(51) Int. Cl.
*G06F 9/48* (2006.01)
*G06F 11/36* (2006.01)

(52) U.S. Cl.
CPC ............. *G06F 9/485* (2013.01); *G06F 11/36* (2013.01)

(58) Field of Classification Search
None
See application file for complete search history.

(56) References Cited

U.S. PATENT DOCUMENTS

| | | | |
|---|---|---|---|
| 6,480,818 B1 | 11/2002 | Alverson et al. | |
| 6,748,556 B1 | 6/2004 | Storino et al. | |
| 7,647,586 B2 | 1/2010 | Long et al. | |
| 7,698,540 B2 | 4/2010 | Norton et al. | |
| 7,757,070 B1 | 7/2010 | Kang et al. | |
| 7,954,102 B2 | 5/2011 | Okawara | |
| 8,032,737 B2 | 10/2011 | Kang et al. | |
| 8,468,532 B2 | 6/2013 | Aguilar, Jr. et al. | |
| 8,850,169 B1 | 9/2014 | Kang et al. | |
| 9,038,070 B2 | 5/2015 | Lippett et al. | |
| 2004/0215939 A1 | 10/2004 | Armstrong et al. | |
| 2006/0294343 A1* | 12/2006 | Rejmaniak | G06F 21/71 712/227 |
| 2008/0163240 A1 | 7/2008 | Aguilar et al. | |
| 2009/0249349 A1* | 10/2009 | Bose | G06F 9/4893 718/103 |
| 2012/0210305 A1* | 8/2012 | Bates | G06F 9/544 717/125 |
| 2013/0007533 A1* | 1/2013 | Miller | G06F 11/263 714/45 |

* cited by examiner

Primary Examiner — Wynuel S Aquino
Assistant Examiner — Melissa A Headly

(57) ABSTRACT

A method for managing thread execution in a processing system is provided. The method includes setting a first watchpoint, and generating a first watchpoint trigger corresponding to the first watchpoint. In response to the first watchpoint trigger, execution of a first thread is controlled in accordance with a value stored in a first control register. Controlling the first thread may further include disabling execution of the first thread. The disabling execution of the first thread may occur within the first watchpoint region.

18 Claims, 5 Drawing Sheets

| ASF | TPS[2] | TPS[1] | TPS[0] |

TPWS
31 30 29 28 27 26 25 24 23 22 21 20 19 18 17 16 15 14 13 12 11 10 9 8 7 6 5 4 3 2 1 0

86

TPWE
31 30 29 28 27 26 25 24 23 22 21 20 19 18 17 16 15 14 13 12 11 10 9 8 7 6 5 4 3 2 1 0

| BITS | NAME | DESCRIPTION |
|---|---|---|
| 31:0 | TPWS | 00000000000000000000000000000000 - TRIGGER DISABLED<br>XXXXXXXXXXXXXXXXXXXXXXXXXXXXXXX1 - USE WATCHPOINT #0<br>XXXXXXXXXXXXXXXXXXXXXXXXXXXXXX1X - USE WATCHPOINT #1<br>XXXXXXXXXXXXXXXXXXXXXXXXXXXXX1XX - USE WATCHPOINT #2<br>... - USE WATCHPOINT #XX<br>XXXXXXXXXXXXXXXXX1XXXXXXXXXXXXXX - USE WATCHPOINT #14<br>XXXXXXXXXXXXXXXX1XXXXXXXXXXXXXXX - USE WATCHPOINT #15<br>XXXXXXXXXXXXXXX1XXXXXXXXXXXXXXXX - USE WATCHPOINT #16<br>... - USE WATCHPOINT #XX<br>X1XXXXXXXXXXXXXXXXXXXXXXXXXXXXXX - USE WATCHPOINT #30<br>1XXXXXXXXXXXXXXXXXXXXXXXXXXXXXXX - USE WATCHPOINT #31 |

DATA PROCESSING SYSTEM HAVING DYNAMIC THREAD CONTROL

BACKGROUND

Field

This disclosure relates generally to data processing systems, and more specifically, to data processing systems having dynamic thread control.

Related Art

Multithreaded processing systems allow for multiple threads to be executed in order to improve processing efficiency. In many systems, explicit register writes are required to enable or disable threads. Therefore, when there is a need to change thread control in application code, it must be recompiled with the change in instructions. Recompiling application code is not always feasible, and can also affect the performance of critical code.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

FIG. 3 illustrates diagrammatic form, a thread priority select register of the CPU of FIG. 2 in accordance with one embodiment of the present invention.

FIG. 4 illustrates diagrammatic form, a thread priority watchpoint start register and thread priority watchpoint end register of the CPU of FIG. 2 in accordance with one embodiment of the present invention.

DETAILED DESCRIPTION

In a data processing system, disabling and enabling execution of available threads is done with dynamic triggering through the use of watchpoint logic. By allowing this type of triggering, threads executing within the data processing system can be controlled without the need to recompile original code to add explicit register write instructions. That is, thread execution can be enabled, disabled, or throttled using watchpoints as triggers without the need to modify or recompile existing code. This thread control may be performed, for example, to control performance of critical code, to implement dynamic power reduction, or to ensure thread processing order.

Figure 1:
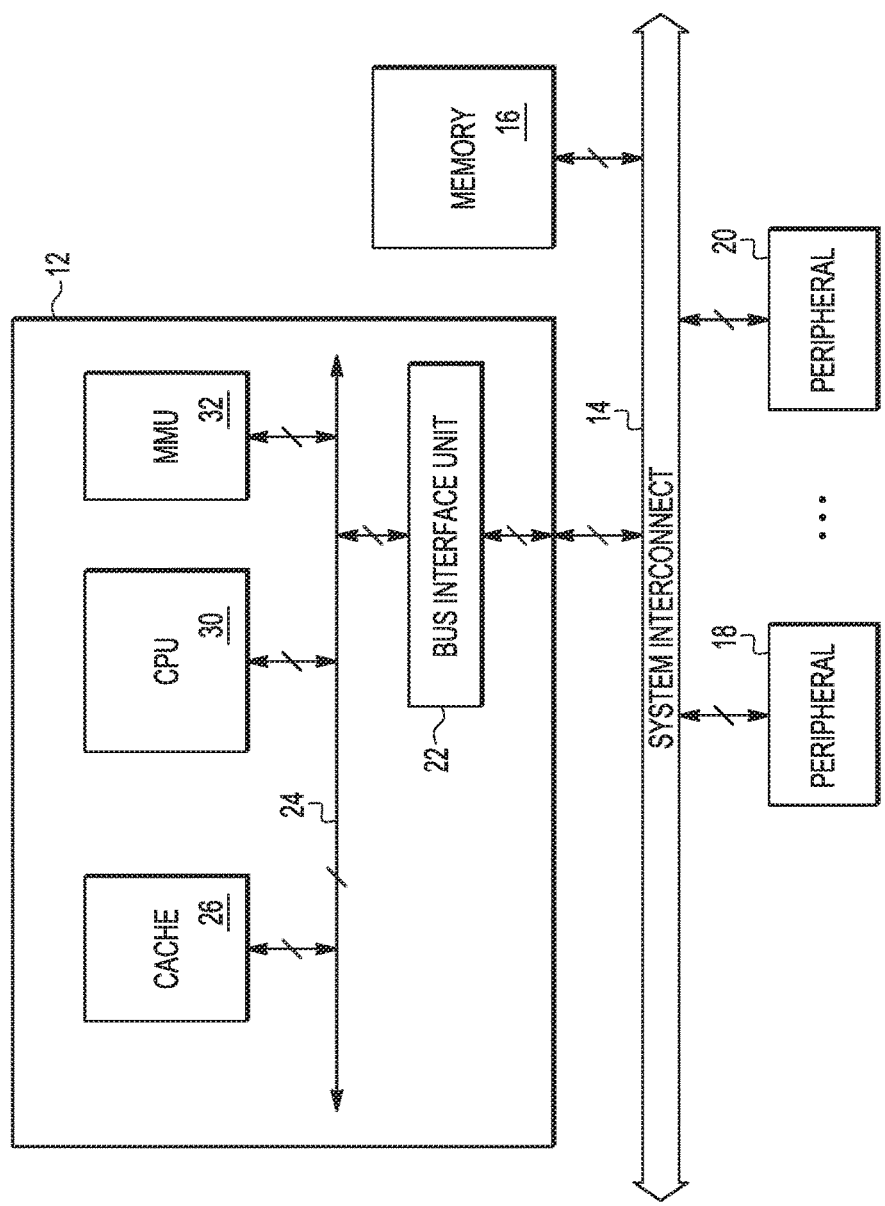
FIG. 1 illustrates, in block diagram form, a data processing system in accordance with one embodiment of the present invention.

FIG. 1 illustrates, in block diagram form, a data processing system 10. Data processing system 10 includes a processor 12, a system interconnect 14, a memory 16 and a plurality of peripherals such as a peripheral 18, a peripheral 20 and, in some embodiments, additional peripherals as indicated by the dots in FIG. 1 separating peripheral 18 from peripheral 20. Memory 16 is a system memory that is coupled to system interconnect 14 by a bidirectional conductor that, in one form, has multiple conductors. In the illustrated form each of peripherals 18 and 20 is coupled to system interconnect 14 by bidirectional multiple conductors as is processor 12. Processor 12 includes a bus interface unit (BIU) 22 that is coupled to system interconnect 14 via a bidirectional bus having multiple conductors. BIU 22 is coupled to an internal interconnect 24 via bidirectional conductors. In one embodiment, internal interconnect 24 is a multiple-conductor communication bus. Coupled to internal interconnect 24 via respective bidirectional conductors is a cache 26, a central processing unit (CPU) 30 and a memory management unit (MMU) 32. CPU 30 is a processor for implementing data processing operations. Each of cache 26, CPU 30 and MMU 32 are coupled to internal interconnect 24 via a respective input/output (I/O) port or terminal.

In operation, processor 12 functions to implement a variety of data processing functions by executing a plurality of data processing instructions. Cache 26 is a temporary data store for frequently-used information that is needed by CPU 30. Information needed by CPU 30 that is not within cache 26 is stored in memory 16. MMU 32 controls accessing of information between CPU 30 and cache 26 and memory 16. In one embodiment, cache 26 is an instruction cache used as a temporary data store for instructions fetched from memory 16. Alternate embodiments may implement cache 26 in different ways, such as a unified cache storing both instructions and data. BIU 22 provides an interface between processor 12 and system interconnect 14. BIU 22 functions to coordinate the flow of information related to instruction execution by CPU 30.

Instruction fetches by CPU 30 are provided as read requests to cache 26. Each read request has a corresponding access address. If the access address of a read request results in a hit of an entry in cache 26, cache 26 provides the instructions from the hit entry to CPU 30. However, if the access address results in a miss in cache 26, cache 26 requests the information stored at the access address from memory 16. Cache 26, in response to a cache miss, provides the read request to BIU 22 which sends the read request external to processor 12 onto system interconnect 14. Once the read request is placed onto system interconnect 14, the read request is processed by memory 16, and BIU 22 waits for the return information from memory 16. Once BIU 22 receives the return read information from memory 16, the return information can be provided to cache 26 and CPU 30. In one embodiment, BIU 22 provides the return information to cache 26, and cache 26 provides the return information to CPU 30.

Figure 2:
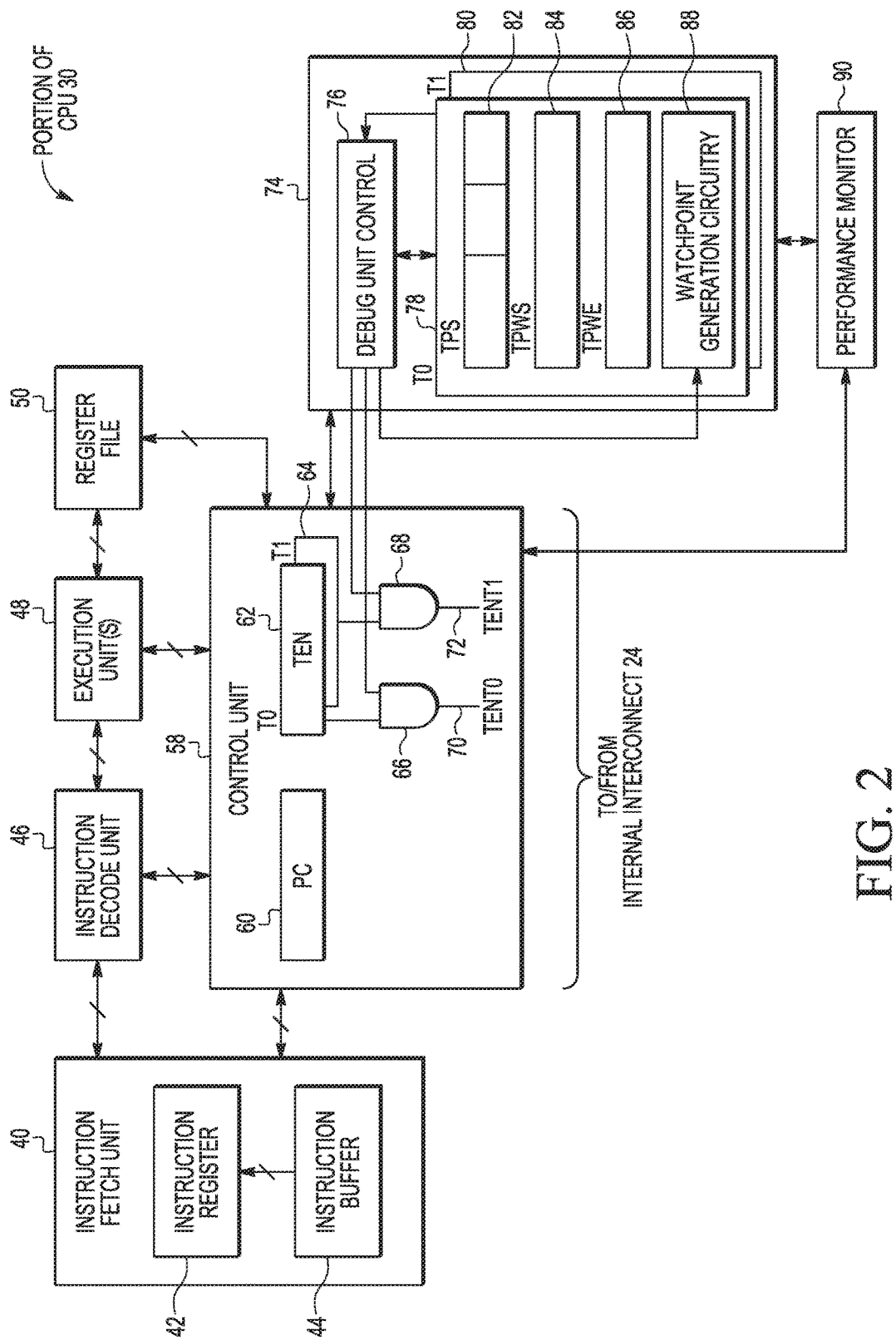
FIG. 2 illustrates, in block diagram form, a portion of a central processing unit (CPU) of the data processing system of FIG. 1 in accordance with one embodiment of the present invention.

Illustrated in FIG. 2 is a detailed portion of CPU 30 of FIG. 1 that relates to the instruction pipeline and the execution of instructions. An instruction fetch unit 40 is illustrated as including both an instruction buffer 44 and an instruction register 42. The instruction buffer 44 has an output that is connected to an input of instruction register 42. A multiple conductor bidirectional bus couples a first output of instruction fetch unit 40 to an input of an instruction decode unit 46 for decoding fetched instructions. An output of instruction decode unit 46 is coupled via a multiple conductor bidirectional bus to one or more execution unit(s) 48. The one or more execution unit(s) 48 is coupled to a register file 50 via a multiple conductor bidirectional bus. A debug unit 74 is bidirectionally coupled to a performance monitor 90. Additionally, each of instruction fetch unit 40, instruction decode unit 46, one or more execution unit(s) 48, register file 50, debug unit 74, and performance monitor 90 is bidirectionally coupled to respective input/output terminals of a control unit 58.

Debug unit 74 includes a debug unit control 76, and thread priority circuitry 78 corresponding to T0 and thread priority circuitry 80 corresponding to T1. Debug unit control 76 is bidirectionally coupled to thread priority circuitry 78 and thread priority circuitry 80. Thread priority circuitry 78 includes control registers, such as a thread priority select register (TPS) 82, a thread priority watchpoint start register (TPWS) 84, and a thread priority watchpoint end registers (TPWE) 86. Circuitry 78 also includes watchpoint generation circuitry 88 which is coupled to debug unit control 76 and may receive inputs from various parts of processor 12 or data processing system 10, including from performance monitor 90, and detect the occurrence of various types of watchpoints, examples of which will be provided below. Thread priority circuitry 80 includes the same control registers and circuitry as thread priority circuitry 78. In the current embodiment, it is assumed that CPU 30 is capable of running up to two threads (referred to as T0 and T1). In alternate embodiments, CPU 30 can be designed to execute any number of threads. In this case, debug unit 74 would include thread priority circuitry, similar to thread priority circuitries 78 and 80, for each thread.

Control unit 58 includes storage circuitry which stores a program counter (PC) 60. Control unit 58 also has thread enable circuitry 62 for T0 and thread enable circuitry 64 for T1. Control unit 58 also includes AND gates 66 and 68 which output a thread 0 enable signal (TENT0) and a thread 1 enable signal (TENT1). Control unit 58 includes circuitry which controls the execution of the threads and thus utilizes TENT0 and TENT1 to enable the corresponding thread to execute. A first input to AND gate 66 and 68 is received from thread enable circuitry 62 and 64, respectively, and a second input to AND gate 66 and 68 is received from debug unit control 76. Therefore, debug unit control 76, based on thread priority circuitries 78 and 80, can override the thread enables provided by thread enable circuitry 62 or 64 by way of AND gates 66 and 68. In this manner, debug unit control 76 can control each of TENT0 and TENT1.

In the illustrated form of this portion of CPU 30, control unit 58 controls instruction fetch unit 40 which is configured to store fetched instructions in instruction buffer 44, in which a next instruction for execution in instruction register 42 is provided to instruction decode unit 46. Instruction decode unit 46 performs instruction decoding for one or more execution unit(s) 48. Register file 50 is used to support one or more execution unit(s) 48. Note that instruction fetch unit 40, instruction decode unit 46, execution units 48 and associated control unit 58 and register file 50 implement an instruction pipeline of CPU 30. Control unit 58 may also include address generation circuitry (not shown) which communicates address, data, and control information with internal interconnect 24. Control unit 58 may also include other circuitry needed to control or operate the instruction pipeline. Therefore, other data and control signals can be communicated via single or multiple conductors between control unit 58 and internal interconnect 24 for implementing data processing instruction execution, as required.

FIG. 3 illustrates, in diagrammatic form, TPS 82, in accordance with one embodiment of the present invention. TPS 82 includes an active status flag (ASF) which indicates when a watchpoint start trigger, in accordance with TPWS 84, has occurred. For example, hardware within debug unit control 76 can set this flag to a logic level "1" when a watchpoint start trigger event occurs. As will be described below, this signifies that thread control begins, in accordance with the values of TPS 82. Hardware can then clear the flag to a logic level "0" when a watchpoint end trigger event occurs and thus normal operation resumes, in which the effective value of TPS 82 would be its disabled status. (Note that in an alternate embodiment, the flag can be set to a logic level "0" and cleared to a logic level "1" instead.) TPS 82 includes 3 bit fields: TPS[2], TPS[1], and TPS[0]. This allows for up to 8 different 3-bit values to be defined for TPS control. More or fewer bit fields may be used if more or less values are needed. Therefore, a TPS value for TPS 82 can be provided as a 3-bit value, such as %000, %001, etc. Note that "%" preceding a value indicates a binary value.

Still referring to FIG. 3, a TPS value of %000 indicates that TPS control is disabled. That is, the watchpoints have no effect and normal priority is given to each thread. In one embodiment, with T0 and T1, this means each thread is given 50% execution time. That is, each thread is alternated to achieve a 50-50 split of execution time. A TPS value of %001 indicates that thread 0 is disabled. For example, when a start watchpoint is triggered, T0 is disabled until an end watchpoint is triggered. A TPS value of %010 indicates that thread 1 is disabled. For example, when a start watchpoint is triggered, T1 is disabled until an end watchpoint is triggered. A TPS value of %011 indicates that T0 is given 75% execution time and T1 25% execution time. A TPS value of %100 indicates that T0 is given 25% execution time and T1 is given 75% execution time. A TPS value of %101 indicates that T0 is given 25% execution time and T1 is given 25% execution time. In this case, only 50% of the CPU resources are used to result in lower power.

In CPU 30, a thread scheduler can schedule threads in accordance with the values of TPS in register 82 when ASF in register 82 is set. The thread scheduler may, for example, periodically disable or enable execution of a thread to achieve the desired thread priority or to throttle thread execution. For example, for a 50-50 split of execution time, the thread scheduler can schedule each thread for a same amount of time. For a 75-25% split, the thread scheduler schedules three times as much time for T0 than T1. For splits that total 100%, the CPU resources are being used at 100% and correspond to full power mode operation. For a 25-25 split, the thread scheduler schedules each thread a same amount of time but for only ¼th the total time for full power mode (in which 100% of the resources are being utilized). For splits that total less than 100%, reduced power is used corresponding to a low power mode. The values of TPS can be set to be any desired split of percentage to achieve the desired priorities for each thread.

FIG. 4 illustrates, in diagrammatic form, TPWS 84 and TPWE 86, in accordance with one embodiment of the present invention. In the illustrated embodiment, each of TPWS 84 and TPWE 86 is a 32 bit values that selects a particular watchpoint for the start trigger watchpoint and end trigger watchpoint, respectively. Each 32 bit value, with the "1" being at a different bit location, corresponds to a watchpoint of watchpoints 0-31. Watchpoint generation circuitry 88 receives inputs from system 10 which indicates when watchpoints are triggered, and when the selected watchpoint for the value in TPWS 84 is triggered, then thread control in accordance with the TPS value in TPS register 82 is commenced. Then when watchpoint generation circuitry 88 indicates that the selected watchpoint for the value in TPWE 86 is triggered, normal thread control resumes, as if a TPS value of 000 were in TPS register 82.

The watchpoints can be any type of watchpoints set to be generated by watchpoint generation circuitry 88. For example, watchpoints can be generated in response to instruction address compares, data address compares, data value compares, PC value compares, etc. Watchpoints may also be generated based on information from performance monitor 90, such as types of instructions executed or statistical information about instruction execution. Therefore, watchpoint generation circuitry 88 may include various debug resources, such as, for example, registers for storing compare values, as well as comparators. Any type of watchpoint may be used as the thread priority watchpoint start or end. For example, the start and end triggers may be based on instruction execution (such as instruction address) or based on other factors not related to instruction execution provided, for example, by performance monitor 90. Note that each thread has its own corresponding TPS register, TPWS register, TPWE register, and watchpoint generation circuitry. In this manner, thread control can be dynamically controlled through watchpoints within any thread executing on CPU 30.

Figure 5:
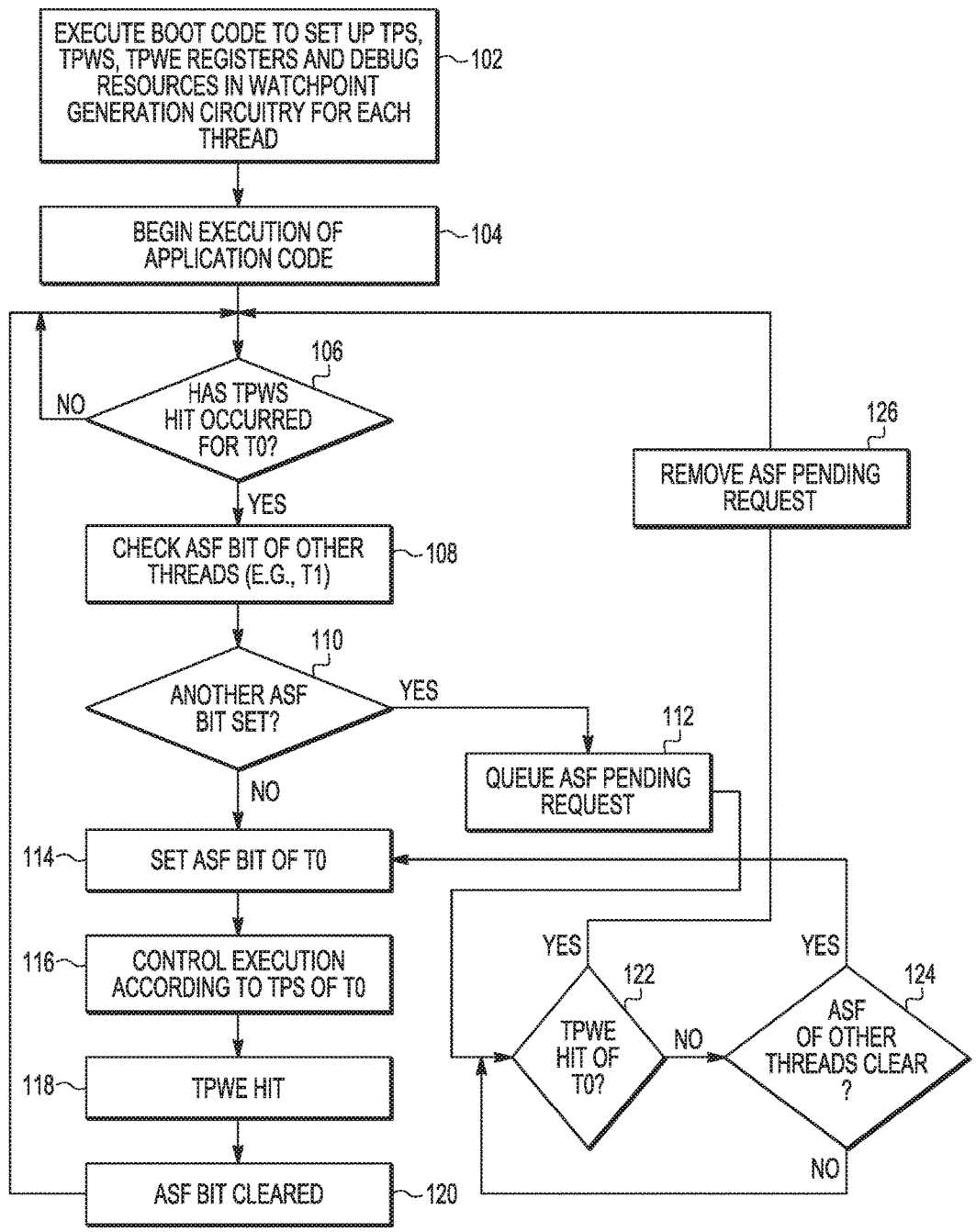
FIG. 5 illustrates, in flow diagram form, a method of controlling thread priority, in accordance with one embodiment of the present invention.

FIG. 5 illustrates, in flow diagram form, a method 100 of controlling thread priority in accordance with one embodiment of the present invention. Method 100 begins with block 102 in which upon boot up of system 10, boot code is executed to set up TPS, TPWS, and TPWE registers as well as to set up debug resources in the watchpoint generation circuitry for each thread. Therefore, in the example of FIG. 2, boot code sets up the registers and debug resources in watchpoint generation circuitry of both thread priority circuitry 78 and 80. Method 100 proceeds to block 104 in which execution of application code begins by CPU 30.

At decision diamond 106, it is determined whether a TPWS hit occurred for T0. That is, with the use of watchpoint generation circuitry 88, it is determined whether the selected start watchpoint indicated by TPWS 84 has been triggered or hit. If not, flow returns to decision diamond 106. If so, method 100 proceeds to block 108 in which the ASF bit of other threads (such as T1, in this example) is checked. At decision diamond 110 it is determined whether the ASF bit is set in another thread. If so, then method 100 proceeds to block 112 in which the request to set the ASF bit in TPS register 82 is queued. In this case, since the ASF bit of another thread is set, another thread is already operating according to its TPS value in its corresponding TPS register. If no other ASF bit is set in another thread, then method 100 proceeds from decision diamond 110 to block 114 in which the ASF bit in TPS register 82 is set (set to a logic level 1). Method 100 proceeds to block 116 in which execution and thread priority is controlled in accordance with the TPS value stored in TPS register 82. Execution continues in this manner until the watchpoint indicated by TPWE 86 hits or is triggered (block 118). Upon the watchpoint indicated by TPWE 86 being triggered, method 100 proceeds to block 120 in which the ASF bit in TPS register 82 is cleared (to a logic level 0). Method 100 then returns to decision diamond 106.

After block 112, in which the ASF pending request is queued, method 100 proceeds to decision diamond 122 in which it is determined if the watchpoint indicated by TPWE 86 of T0 has been hit. If so, method 100 proceeds to block 126 in which the ASF pending request that was queued in block 112 is removed from the queue and the flow returns to decision diamond 106. If not, method 100 proceeds to decision diamond 124 in which it is determined if the ASF bit for the other thread has been cleared so that the current ASF request can proceed. If not, method 100 returns to decision diamond 122. If so, however, method 100 continues to block 114 where the ASF bit of T0 in TPS register 82 is set. That is, since no other ASF was set, no other thread is controlling thread priority through its TPS register, and T0 can safely control its thread priority through its TPS value in TPS register 82.

Figure 6:
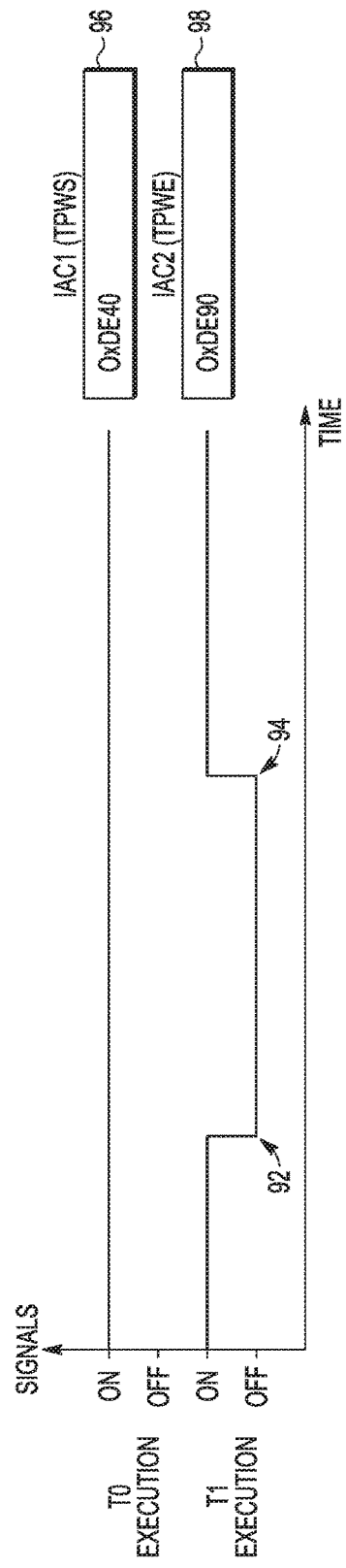
FIG. 6 illustrates, in timing diagram form, example executions of two threads and corresponding control register values in accordance with one embodiment of the present invention.

FIG. 6 illustrates, in timing diagram form, example executions of two threads and corresponding control register values in accordance with one embodiment of the present invention. In the example of FIG. 6, it is assumed that a code block A and a code block B are being executed in CPU 30 by threads T0 and T1, respectively. Code block A is in memory region 0xF000 to 0xFFFF. Code block B is in memory region 0x2000 to 0x300, in which a "0x" preceding a number indicates a hexadecimal value. Code block A contains a performance critical routine which requires all other threads to be disabled. This critical code is located in memory region 0xDE40 to 0xDE90. Therefore, boot code is used to set up a first instruction address compare (IAC1) register 96 in watchpoint generation circuitry 88 with 0xDE40 and a second instruction address compare (IAC2) register 98 in watchpoint generation circuitry 88 with 0xDE90. TPWS 84 is set to indicate the watchpoint corresponding to IAC1 and TPWE 86 is set to indicate the watchpoint corresponding to IAC2. Also, the TPS value in TPS register 82 is set to %010. Therefore, when the instruction at 0xDE40 is executed by CPU 30, TPWS is triggered at point 92 (when the value of PC 60 equals 0xDE40). In response, the ASF bit in TPS register 82 is set and T1 is disabled, as shown in FIG. 6. However, T0 is maintained enabled during this critical code. When the instruction at 0xDE90 is executed by CPU 30, TPWE 86 is triggered at point 94 (when the value of PC 60 equals 0xDE90) and therefore T1 is re-enabled. In this case, the ASF bit is cleared and the effective TPS value becomes %000 in which both threads execute normally, without being affected by watchpoints.

Note that the memory region between the TPWS trigger and its corresponding TPWE trigger can be referred to as a watchpoint region. A watchpoint trigger is generated when code execution enters the watchpoint region. In response to this trigger, thread execution is controlled by the corresponding TPS value. A watchpoint trigger is also generated when code execution exits the watchpoint region. Therefore, in FIG. 6, the memory region between 0xde40 and 0xde90 may be referred to a watchpoint region.

Therefore, by now it can be understood how watchpoints may be used to dynamically control thread execution. Furthermore, the resources, such as thread priority control registers and watchpoint registers, can be set up by boot code so that threads can be appropriately enabled/disabled or throttled in response to watchpoints. In this manner, the application code itself executing on CPU 30 need not be modified and recompiled to include specific write register instructions to enable or disable threads.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, a plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals. For example, rather than buses, each of internal and external interconnects 24 and 14 may be implemented as interconnect fabrics or switches.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Also for example, in one embodiment, the illustrated elements of data processing system 10 are circuitry located on a single integrated circuit or within a same device. Alternatively, data processing system 10 may include any number of separate integrated circuits or separate devices interconnected with each other. For example, memory 16 may be located on a same integrated circuit as processor 12 or on a separate integrated circuit or located within another peripheral or slave discretely separate from other elements of data processing system 10. Peripherals 18 and 20 may also be located on separate integrated circuits or devices. Also for example, data processing system 10 or portions thereof may be soft or code representations of physical circuitry or of logical representations convertible into physical circuitry. As such, data processing system 10 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

Below are various embodiments of the present invention.

In one embodiment, a method for managing thread execution in a processing system includes setting a first watchpoint; generating a first watchpoint trigger corresponding to the first watchpoint; and in response to the first watchpoint trigger, controlling execution of a first thread in accordance with a value stored in a first control register. In one aspect, the method further comprises generating a second watchpoint trigger corresponding to a second watchpoint, and in response to the second watchpoint trigger, resuming normal execution of the first thread. In a further aspect, controlling the first thread further comprises disabling execution of the first thread, the disabling execution of the first thread occurring between the first watchpoint trigger and the second watchpoint trigger. In another further aspect, controlling the first thread further comprises throttling execution of the first thread between the first watchpoint trigger and the second watchpoint trigger. In yet another aspect, the method further includes setting a flag in the first control register, the flag providing an indication to a second thread that execution of one or more threads is affected by the first watchpoint trigger. In another aspect, setting the first watchpoint further comprises setting the first watchpoint during execution of boot code. In another aspect, the first watchpoint is triggered by an interrupt during execution of application code. In another aspect, the first watchpoint includes a watchpoint start address and the second watchpoint includes a watchpoint end address. In a further aspect, the method further includes enabling a first watchpoint region by setting the first watchpoint and the second watchpoint; and using a debug unit for determining that code execution enters the first watchpoint region, and for generating the first watchpoint trigger corresponding to code execution entering the first watchpoint region. In yet a further aspect, the method further includes enabling a second watchpoint region; generating a third watchpoint trigger corresponding to code execution entering the second watchpoint region; and in response to the third watchpoint trigger, controlling execution of a second thread in accordance with a value stored in a second control register.

In another embodiment, a method for managing thread execution in a processing system includes enabling a first watchpoint region, the first watchpoint region beginning at a first watchpoint and ending at a second watchpoint; generating a first watchpoint trigger corresponding to a first address of executing code matching the first watchpoint; and in response to the first watchpoint trigger, controlling execution of a first thread based on a value stored in a first control register. In one aspect of the another embodiment, the method further includes generating a second watchpoint trigger corresponding to a second address of executing code matching the second watchpoint, and in response to the second watchpoint trigger, resuming normal execution of the first thread. In a further aspect, controlling the first thread further comprises disabling execution of the first thread, the disabling execution of the first thread occurring within the watchpoint region. In another further aspect, controlling the first thread further comprises throttling execution of the first thread, the throttling execution of the first thread occurring within the watchpoint region. In yet another aspect of the another embodiment, the method further includes setting a flag in the first control register, the flag providing an indication to a second thread that execution of one or more threads is affected by code execution in the first watchpoint region. In another aspect, the first address of executing code matching the first watchpoint is a first program counter address of executing code matching the first watchpoint. In another aspect, enabling the first watchpoint region further comprises enabling the first watchpoint region during execution of boot code.

In yet another embodiment, a processing system includes a processor capable of executing code; a memory coupled to the processor, the memory storing executable code; a control unit coupled to the processor, the control unit including a control register, and in response to a watchpoint trigger, the control unit controls execution of one or more threads based on a value stored in the control register; and a debug unit coupled to the control unit, the debug unit generating the watchpoint trigger based on code execution entering a first watchpoint region of the memory. In one aspect, the debug unit further comprises generating a second watchpoint trigger based code execution exiting the first watchpoint region, and in response to the second watchpoint trigger, resuming normal execution of the thread. In a further aspect, the control unit controlling the first thread further comprises disabling execution of the first thread, the disabling execution of the first thread occurring between the first watchpoint trigger and the second watchpoint trigger.

What is claimed is:

1. A method for managing thread execution in a processing system configured to execute at least two threads, the method comprising:
   setting a first watchpoint and a second watchpoint, wherein the first watchpoint and the second watchpoint correspond to a first thread of the at least two threads;
   after setting the first watchpoint and the second watchpoint, commencing execution of the at least two threads in accordance with a normal priority of each thread;
   while executing the first thread, generating a first watchpoint trigger when the first watchpoint of the first thread is hit; and
   in response to the first watchpoint trigger, controlling execution of each thread of the at least two threads in accordance with a value stored in a first control register corresponding to the first thread, wherein the value indicates a priority of each thread of the at least two threads by indicating a percentage of execution time of each thread of the at least two threads and the priority for each thread is different from the normal priority of each thread; and
   while executing the first thread, after generating the first watchpoint trigger, generating a second watchpoint trigger when the second watchpoint of the first thread is hit; and
   in response to the second watchpoint trigger, resuming the normal priority of each of the at least two threads.

2. The method of claim 1, wherein controlling execution of the at least two threads further comprises disabling execution of the first thread and not disabling execution of the second thread, the disabling execution of the first thread occurring between the first watchpoint trigger and the second watchpoint trigger.

3. The method of claim 1, further comprising setting a flag in the first control register, the flag providing an indication to a second thread that execution of one or more threads is affected by the first watchpoint trigger.

4. The method of claim 1, wherein setting the first watchpoint further comprises setting the first watchpoint during execution of boot code.

5. The method of claim 1, wherein the first watchpoint is triggered by an interrupt during execution of application code.

6. The method of claim 1, wherein the first watchpoint includes a watchpoint start address and the second watchpoint includes a watchpoint end address.

7. The method of claim 6, further comprising:
   enabling a first watchpoint region corresponding to the first thread by setting the first watchpoint and the second watchpoint; and
   using a debug unit for determining that code execution enters the first watchpoint region, and for generating the first watchpoint trigger corresponding to code execution entering the first watchpoint region.

8. The method of claim 7, further comprising:
   enabling a second watchpoint region corresponding to a second thread;
   generating a third watchpoint trigger corresponding to code execution entering the second watchpoint region; and
   in response to the third watchpoint trigger, controlling execution of the at least two threads in accordance with a value stored in a second control register corresponding to the second thread, wherein the value stored in the second control register indicates a priority of each thread of the at least two threads.

9. A method for managing thread execution in a processing system configured to execute at least two threads, the method comprising:
   enabling a first watchpoint region corresponding to a first thread, the first watchpoint region beginning at a first watchpoint and ending at a second watchpoint, wherein execution of the at least two threads begins after enabling the first watchpoint and the second watchpoint and the at least two threads execute in accordance with a normal priority of each thread;
   generating a first watchpoint trigger when a first address of executing code in the first thread matches the first watchpoint; and
   in response to the first watchpoint trigger, controlling execution of each thread of the at least two threads based on a value stored in a first control register corresponding to the first thread, wherein the value indicates a priority of each thread of the at least two threads and the priority for each thread is different from the normal priority of each thread, and wherein controlling the execution of the at least two threads further comprises throttling execution of the first thread, the throttling execution of the first thread occurring within the watchpoint region; and while executing the first thread, after generating the first watchpoint trigger, generating a second watchpoint trigger when a second address of executing code in the first thread matches the second watchpoint; and in response to the second watchpoint trigger, resuming execution of the at least two threads in accordance with the normal priority of each thread.

10. The method of claim 9, wherein controlling execution of the at least two threads further comprises disabling execution of the first thread, the disabling execution of the first thread occurring within the first watchpoint region.

11. The method of claim 9, further comprising setting a flag in the first control register corresponding to the first thread, the flag providing an indication to the second thread that execution of one or more threads is affected by code execution in the first watchpoint region.

12. The method of claim 9, wherein the first address of executing code matching the first watchpoint is a first program counter address of executing code matching the first watchpoint.

13. The method of claim 9, wherein enabling the first watchpoint region further comprises enabling the first watchpoint region during execution of boot code.

14. A processing system, comprising:
a processor capable of executing code having two or more threads;
a memory coupled to the processor, the memory storing executable code;
a control unit coupled to the processor, the control unit commencing execution of the two or more threads in accordance with a normal priority of each thread;
the control unit further including a control register corresponding to each thread of the two or more threads, and in response to a watchpoint trigger occurring during execution of a first thread of the two or more threads and indicated by a first control register corresponding to the first thread, the control unit controls execution of each thread of the two or more threads based on a value stored in the first control register, wherein the value stored in the first control register indicates a priority of each thread of the two or more threads by indicating a percentage of execution time of each thread of the two or more threads and wherein the priority for each thread is different from the normal priority of each thread; and a debug unit coupled to the control unit, the debug unit generating the watchpoint trigger based on code execution entering a first watchpoint region of the memory, wherein the first watchpoint region is indicated by the first control register corresponding to the first thread, wherein the debug unit further comprises generating a second watchpoint trigger corresponding to the first thread based on code execution exiting the first watchpoint region, and in response to the second watchpoint trigger, resuming execution of the two or more threads in accordance with the normal priority of each thread.

15. The processing system of claim 14, wherein the control unit controlling the one or more threads further comprises disabling execution of the first thread, the disabling execution of the first thread occurring between the first watchpoint trigger and the second watchpoint trigger.

16. The method of claim 1, wherein controlling execution of the at least two threads in accordance with the value stored in the first control register comprises executing the at least two threads in accordance with the priority indicated by the value stored in the first control register.

17. The method of claim 1, wherein controlling execution of the at least two threads further comprises throttling execution of each of the at least two threads between the first watchpoint trigger and the second watchpoint trigger.

18. The method of claim 9, wherein the method further comprises:
prior to generating the first watchpoint trigger, executing the at least two threads in accordance with a normal priority of each thread; and
while executing code is within the first watchpoint region, executing the at least two threads in accordance with the priority indicated by the value stored in the first control register.

* * * * *